(12) United States Patent
Yuyama et al.

(10) Patent No.: US 8,305,465 B2
(45) Date of Patent: Nov. 6, 2012

(54) IMAGE PICK-UP APPARATUS WITH A SHAKE REDUCING FUNCTION

(75) Inventors: Masami Yuyama, Ome (JP); Tsuyoshi Matsunaga, Sayama (JP); Yoshiyuki Kato, Higashiyamato (JP); Takeshi Tsukagoshi, Tachikawa (JP); Masaru Onozawa, Akishima (JP); Shohei Sakamoto, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 577 days.

(21) Appl. No.: 12/473,537

(22) Filed: May 28, 2009

(65) Prior Publication Data

US 2009/0231448 A1  Sep. 17, 2009

Related U.S. Application Data

(62) Division of application No. 11/454,431, filed on Jun. 15, 2006, now Pat. No. 7,710,458.

(30) Foreign Application Priority Data

Jun. 17, 2005 (JP) .................. 2005-178642
Jun. 17, 2005 (JP) .................. 2005-178643
Jun. 17, 2005 (JP) .................. 2005-178644
Jun. 28, 2005 (JP) .................. 2005-187951

(51) Int. Cl.
*H04N 5/262* (2006.01)
*G03B 17/00* (2006.01)
*H01L 27/00* (2006.01)
*H01L 31/062* (2012.01)

(52) U.S. Cl. .............. 348/240.1; 396/72; 250/208.1; 257/291

(58) Field of Classification Search ............... 348/240.2, 348/240.1, 234, 273–283, 308, 208.6, 216.1, 348/208.2, 220.1, 441, 240.3, 369; 396/121–123, 396/60, 72–88; 250/208.1; 359/354, 676
See application file for complete search history.

(56) References Cited

U.S. PATENT DOCUMENTS 5,386,228 A  1/1995  Okino
(Continued)

FOREIGN PATENT DOCUMENTS

EP  0 516 829 B1  8/1996
(Continued)

OTHER PUBLICATIONS

International Search Report and Written Opinion of the International Searching Authority for PCT/JP2006/312550, dated May 30, 2007, 17 Sheets.

(Continued)

*Primary Examiner* — Aung S Moe
*Assistant Examiner* — Mekonnen Dagnew
(74) *Attorney, Agent, or Firm* — Holtz, Holtz, Goodman & Chick, PC

(57) ABSTRACT

When a hand shake reducing mode has been set for shooting a subject, an exposure is controlled in accordance with a program diagram (solid line) B for the shake reducing mode, which is different from a program diagram (broken line) A for a normal mode. In a state where a shutter speed is set to less than "1/80", two-pixel addition and/or four-pixel addition is executed on an imaging signal to amplify subject luminance, raising ISO sensitivity. A shutter speed set to fall in a high speed range reduces deterioration in image quality due to hand shake and/or subject movement during a shooting operation.

4 Claims, 12 Drawing Sheets

U.S. PATENT DOCUMENTS

| | | |
|---|---|---|
| 6,876,386 B1 | 4/2005 | Ito |
| 6,924,837 B2 | 8/2005 | Wakui |
| 7,057,645 B1 * | 6/2006 | Hara et al. ............... 348/208.6 |
| 7,319,478 B2 | 1/2008 | Dolt et al. |
| 7,372,488 B2 | 5/2008 | Kubo |
| 2001/0010544 A1 | 8/2001 | Wakui |
| 2001/0012063 A1 | 8/2001 | Maeda |
| 2001/0024234 A1 | 9/2001 | Kubo |
| 2002/0154228 A1 * | 10/2002 | Matsumura ............... 348/240.2 |
| 2002/0191104 A1 * | 12/2002 | Matsutani et al. ........... 348/441 |
| 2003/0169355 A1 | 9/2003 | Kubo |
| 2003/0189663 A1 | 10/2003 | Dolt et al. |
| 2004/0070680 A1 | 4/2004 | Oda et al. |
| 2004/0095485 A1 | 5/2004 | Ueda et al. |
| 2005/0046704 A1 | 3/2005 | Kinoshita |
| 2005/0053291 A1 | 3/2005 | Mishima et al. |
| 2005/0078201 A1 | 4/2005 | Sakaguchi |
| 2005/0147327 A1 | 7/2005 | Choi et al. |
| 2006/0238621 A1 | 10/2006 | Okubo et al. |
| 2008/0186391 A1 | 8/2008 | Kubo |

FOREIGN PATENT DOCUMENTS

| | | | |
|---|---|---|---|
| JP | 2000-197065 A | | 7/2000 |
| JP | 2001-215548 A | | 8/2001 |
| JP | 2002-281375 A | | 9/2002 |
| JP | 2003-189183 A | | 7/2003 |
| JP | 2003-264844 A | | 9/2003 |
| JP | 2003-319211 A | | 11/2003 |
| JP | 2003-319247 A | | 11/2003 |
| JP | 2004096611 A | * | 3/2004 |
| JP | 2004-248147 A | | 9/2004 |
| JP | 2005-115598 A | | 4/2005 |
| JP | 2005-117187 A | | 4/2005 |
| JP | 2005-303519 | | 10/2005 |
| WO | WO 92/11727 A1 | | 7/1992 |

OTHER PUBLICATIONS

A Chinese Office Action (and English translation thereof) dated Nov. 7, 2008, issued in a counterpart Chinese Application.

Japanese Office Action dated Mar. 17, 2009 (4 pages), and English translation thereof (6 pages), issued in counterpart Japanese Application Serial No. 2005-178642.

Japanese Office Action dated Mar. 17, 2009 (3 pages), and English translation thereof (4 pages), issued in counterpart Japanese Application Serial No. 2005-178643.

Japanese Office Action dated Mar. 17, 2009 (2 pages), and English translation thereof (3 pages), issued in counterpart Japanese Application Serial No. 2005-178644.

Japanese Office Action dated Mar. 17, 2009 (3 pages), and English translation thereof (4 pages), issued in counterpart Japanese Application Serial No. 2005-187951.

Japanese Office Action dated May 26, 2009 (2 pages), and English translation thereof (3 pages), issued in counterpart Japanese Application Serial No. 2005-178644.

Japanese Office Action dated May 26, 2009 (2 pages), and English translation thereof (3 pages), issued in counterpart Japanese Application Serial No. 2005-178642.

Japanese Office Action dated Jul. 19, 2011 (and English translation thereof) in counterpart Japanese Application No. 2009-13279.

Japanese Office Action dated Aug. 4, 2009 and English translation thereof issued in a counterpart Japanese Application No. 2005-178642 of parent U.S. Appl. No. 11/454,431.

U.S. Office Action dated Aug. 6, 2009, issued in parent U.S. Appl. No. 11/454,431.

Extended European Search Report (EESR) dated Oct. 20, 2011 (in English) in counterpart European Application No. 10014299.1.

* cited by examiner

FIRST FIELD

SECOND FIELD

FIG.4

FIRST FIELD

SECOND FIELD

IMAGE PICK-UP APPARATUS WITH A SHAKE REDUCING FUNCTION

CROSS-REFERENCE TO RELATED APPLICATIONS

The present application is a Divisional Application of U.S. application Ser. No. 11/454,431 filed Jun. 15, 2006, now U.S. Pat. No. 7,710,458 which is based upon and claims the benefit of priority from prior Japanese Patent Applications No. 2005-178642, filed Jun. 17, 2005; No. 2005-178643, filed Jun. 17, 2005; No. 2005-178644, filed Jun. 17, 2005; and No. 2005-187951, filed Jun. 28, 2005, the entire contents of all of which are incorporated herein by reference.

BACKGROUND OF THE INVENTION

1. Field of the Invention

The present invention relates to an image pick-up apparatus, which can be used for a digital camera.

2. Description of the Related Art

As a hand shake preventing mechanism used in digital cameras for preventing or compensating a hand shake due to movement of a camera body at still image shooting is known, for example, an arrangement provided with an image pick-up lens system whose optical system is arranged movably, or an optical system (variable apex angle prism) which is optically movable, to make an image location move on an image pick-up element (to move an optical axis) while the image pick-up element is being exposed to photograph a subject. Meanwhile, another arrangement is known, that makes the image pick-up element itself move while the image pick-up element is being exposed. In general, to control movement of the image location and/or the image pick-up element itself, the digital camera is provided with two sensors disposed respectively in the horizontal and vertical directions to detect the direction of shake. The camera controls such movement of the image location or the image pick-up element based on the detection result. (Refer to, for example, Japanese Laid-open Patent Application No. 2004-348147.)

BRIEF SUMMARY OF THE INVENTION

According to one aspect of the invention, there is provided an image pick-up apparatus which comprises an image pick-up unit for shooting a subject to output a shot image, a luminance obtaining unit for obtaining a subject luminance, a first exposure adjusting unit for making the image pick-up unit execute a pixel addition process to raise luminance of the shot image, when the subject luminance obtained by the luminance obtaining unit is lower than a predetermined value, and a second exposure adjusting unit for controlling a shutter speed of the image pick-up unit in accordance with the subject luminance obtained by the luminance obtaining unit without making the image pick-up unit execute the pixel addition process, when the subject luminance obtained by the luminance obtaining unit is higher than a predetermined value.

According to another aspect of the invention, there is provided an image pick-up apparatus which comprises an image pick-up unit for shooting a subject to output a shot image, a luminance obtaining unit for obtaining a subject luminance, a first exposure adjusting unit for making the image pick-up unit execute a pixel addition process in a first pixel addition mode to raise luminance of the shot image, when the subject luminance obtained by the luminance obtaining unit is lower than a first predetermined value, and a second exposure adjusting unit for making the image pick-up unit execute a pixel addition process in a second pixel addition mode to raise luminance of the shot image, the number of pixels to be added in the second pixel addition mode being larger than in the first pixel addition mode, when the subject luminance obtained by the luminance obtaining unit is lower than a second predetermined value which is lower than the first predetermined value.

According to other aspect of the invention, there is provided an image pick-up apparatus which comprises an image pick-up unit for shooting a subject to output a shot image, and a driving unit for driving the image pick-up unit in plural fields, and for making the image pick-up unit execute a pixel addition process in a pixel addition mode, whereby pixel signals of plural pixels having the same color and locating adjacent to each other are added in each field.

According to still another aspect of the invention, there is provided an image pick-up apparatus which comprises an image pick-up unit for shooting a subject to output a shot image, a pixel adding unit for making the image pick-up unit execute a pixel addition, an image enlarging unit for performing an enlarging process to enlarge the shot image output from the image pick-up unit, when the pixel addition process has been executed in the image pick-up unit by the pixel adding unit, a pixel adding count changing unit for changing the number of pixels to be added in the pixel addition process to be executed by the image pick-up unit, and an enlarging ratio changing unit for changing the enlarging ratio at which the image enlarging unit executes the enlarging process, when the pixel adding count changing unit has changed the number of pixels to be added.

According to yet another aspect of the invention, there is provided an image pick-up apparatus which comprises an image pick-up unit for shooting a subject to output a shot image, a pixel adding unit for making the image pick-up unit execute a pixel addition process, a selecting unit for determining whether to make the pixel adding unit execute the pixel addition process or not, and an image enlarging unit for performing an enlarging process to enlarge the shot image output from the image pick-up unit after the pixel addition process is executed in the image pick-up unit by the pixel adding unit, when the selecting unit has determined to make the pixel adding unit execute the pixel addition process.

According to still other aspect of the invention, there is provided an image pick-up apparatus which comprises an image pick-up unit for shooting a subject to output a shot image, a pixel adding unit for making the image pick-up unit execute a pixel addition process to add pixel signals of plural pixels having the same color and locating adjacent to each other, and a phase adjusting unit for adjusting a phase of a color component to be interpolated for each pixel in a color interpolation process on the basis of disposal of the pixel included in the shot image in a pixel space, which varies during the pixel addition process executed by the pixel adding unit.

BRIEF DESCRIPTION OF THE SEVERAL VIEWS OF THE DRAWING

FIG. 4 is a schematic view illustrating Bayer data consisting of an imaging signal read out in the two-pixel addition mode.

DETAILED DESCRIPTION OF THE INVENTION

Figure 1:
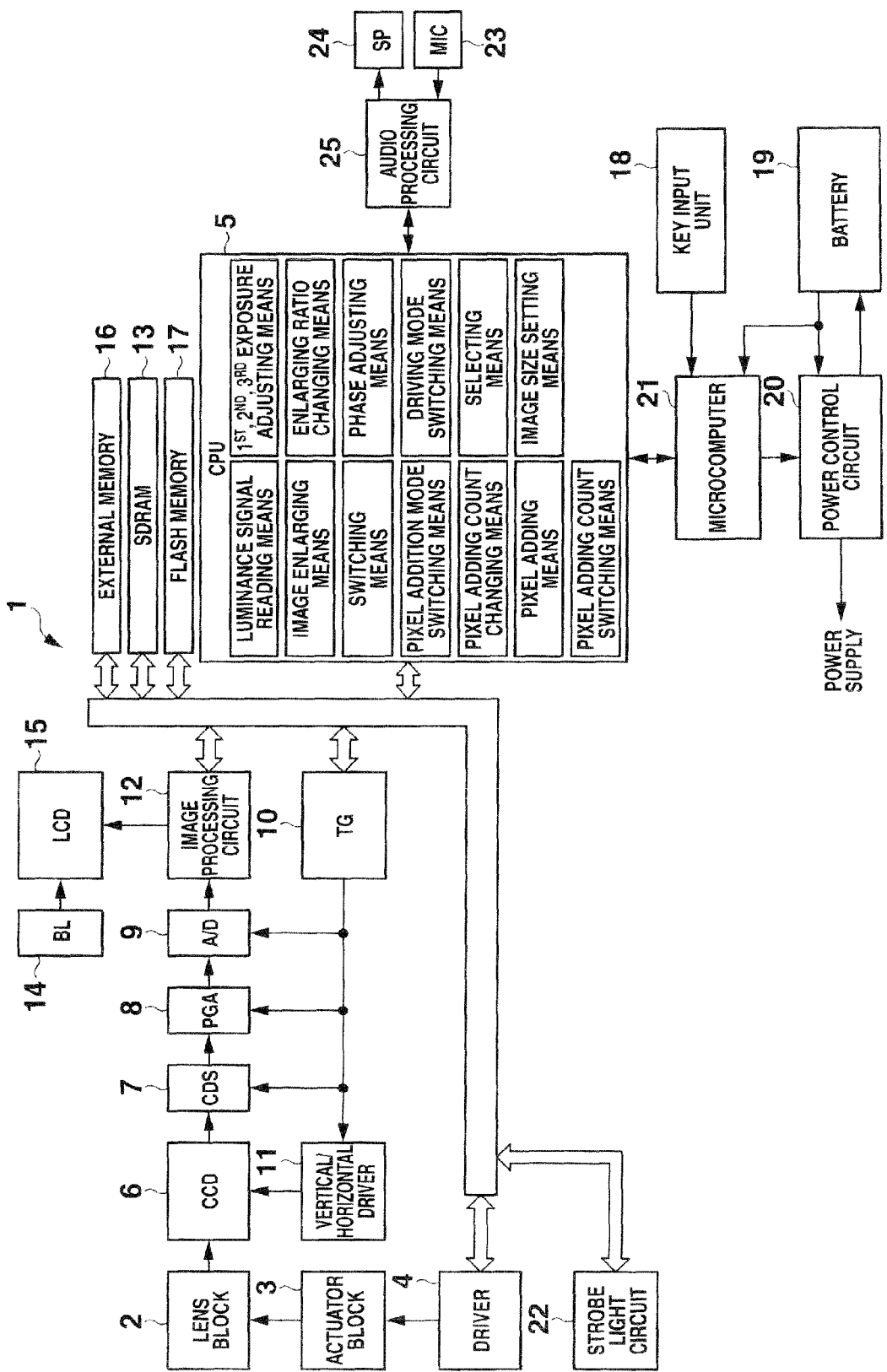
FIG. 1 is a block diagram of a digital camera according to an embodiment of the present invention.

Now, an embodiment of an image pick-up apparatus of the present invention applied to a digital camera will be described with reference to the accompanying drawings. FIG. 1 is a block diagram showing an electronic configuration of a digital camera 1 according to the invention. The digital camera 1 has shooting modes, including a still image shooting mode and movie shooting mode.

As shown in FIG. 1, the digital camera 1 has a lens block 2. The digital camera 1 is provided with various functions, such as a zoom function, AF (automatic focusing function), AE (automatic exposure setting function), and the like. The lens block 2 has a lens group including zoom lenses and focus lenses, aperture and shutter mechanism (not shown).

An actuator block 3 includes a zoom motor and focus motor for driving the zoom lenses and focus lenses, an aperture actuator for driving and setting an aperture, and a shutter actuator for driving the shutter mechanism to open or close the shutter. The aperture mechanism in the present embodiment has two positions, that is, a wide opening position and a narrow opening position. A driver circuit 4 has a driver for driving the two motors and two actuators in the actuator block 3. The driving circuit 4 generates various driving signals on the basis of instruction supplied from CPU 5, which controls whole operation of the digital camera 1 and supplies the generated driving signal to the actuator block 3 to drive components of the lens block 2. The shutter mechanism can be replaced with an electronic shutter.

Further, the digital camera 1 is provided with CCD 6 for receiving incident light of a subject passing through the lens block 2, correlated double sampling circuit (CDS) 7, programmable gain amplifier (PGA) 8, and A/D converter (A/D) 9.

CCD 6 is a solid state imaging device having a light sensing surface, on which a light image of a subject is formed, and the light sensing surface is covered with a fundamental color filter of the Bayer pattern. CCD 6 is driven by a vertical/horizontal driver 11 based on a timing signal which is generated by a timing signal generator (TG) 10 based on an instruction of CPU 5, whereby CCD 6 generates an analog imaging signal corresponding to an optical image of a subject, and outputs the same to the correlated double sampling circuit 7. In the present embodiment, the vertical/horizontal driver 11 cooperates with CCD 6 to compose a pixel adding unit of the embodiment.

The correlated double sampling circuit 7 executes a correlated double sampling operation on an entered imaging signal to reduce noises involved in the imaging signal, and outputs the imaging signal to the programmable gain amplifier 8. The programmable gain amplifier 8 adjusts its gain to that corresponding to ISO sensitivity to amplify the imaging signal with noises reduced. A/D converter 9 samples the imaging signal supplied from the programmable gain amplifier 8 to convert the same into a digital signal of a predetermined number of bits, and outputs the digital signal to an image processing circuit 12.

In accordance with an instruction form CPU 5, the image processing circuit 12 uses SDRAM 13 as a work memory, and executes RGB interpolation process to generate RGB color component data (hereafter, RGB data) for each pixel on the basis of the entered digital imaging signal (Bayer data), YUV conversion process to generate YUV data for each pixel, including a luminance signal (Y) and a color-difference signal (U, V), and a digital signal process for enhancing an image quality, including an automatic white balance process, and edge enhancement process. YUV data converted by the image processing circuit 12 is successively stored on SDRAM 13.

YUV data stored on SDRAM 13 is converted into a video signal every time one frame data is stored on SDRAM 13, and the video image is supplied to a liquid crystal monitor (LCD) 15 with a back light provided thereon, whereby a through image is displayed on the liquid crystal monitor 15. When a shooting operation is executed with a shutter release key in the still image shooting mode (when the shutter release key is pressed full-way), image data temporarily stored on SDRAM 13 is compressed by CPU 5, and finally recorded on an external memory 16 as a still image file in a predetermined format. During movie shooting operation in the movie shooting mode, plural pieces of image data stored on SDRAM 13 at a predetermined frame rate are successively compressed by CPU 5 and finally recorded on the external memory 16 as a movie file.

The external memory 16 comprises, for example, various sorts of memory cards. The still image file and movie file recorded on the external memory 16 are read out and expanded by CPU 5 as needed in response to user's operation in the play back mode, and further expanded as YUV data on SDRAM 13 to be displayed on the liquid crystal monitor 15.

Further, the digital camera 1 is provided with a data rewritable nonvolatile memory 17 such as flash memory. On the flash memory 17 are stored various programs for CPU 5 to control various operations such as AE control, AF control, AWB control operation in the digital camera 1, and various sorts of data to be used when these operations are performed. In particular, on the flash memory 17 are stored a program for CPU 5 to serve as a pixel adding unit, phase adjusting unit, luminance signal or data reading unit, switching unit, setting unit, and receiving unit, and control data constituting program diagrams used in AE control operation during the still image shooting, as will be described later.

The digital camera 1 further comprises a key input unit 18, including a shutter release button, power key, mode selecting switch, zoom-up/down button and the like (not shown), a rechargeable battery 19 such as a nickel-metal-hydride battery, power control circuit 20 for supplying electric power of the battery 19 to various units in the digital camera 1, and a microcomputer 21 for controlling operations of these components. The microcomputer 21 scans the states of various switches in the key input unit 18 to detect whether any of the switches has been operated. When the user operates either of the switches, the microcomputer 21 generates a control signal corresponding to the operated switch, and sends the control signal to CPU 5. The shutter release button has a half-press function, i.e. a half-way pressing function and a full-way pressing function.

Further, CPU 5 is connected with a strobe light circuit 22, which includes a light emitting tube such as a xenon lamp, its driving circuit, and emits auxiliary light according to need during a still image shooting operation. The digital camera 1 is provided with an audio recording function for recording surrounding sounds in the movie shooting mode. CPU 5 is connected with an audio processing block 25 including a microphone (MIS) 23 and a speaker (SP) 24. The audio processing block 25 converts an audio signal from the microphone 23 into digital data, and supplies the digital data to CPU 5. Meantime, the audio processing block 25 converts the audio data recorded on the external memory 16 together with movie file into audio data to drive the speaker 24.

Figure 2:
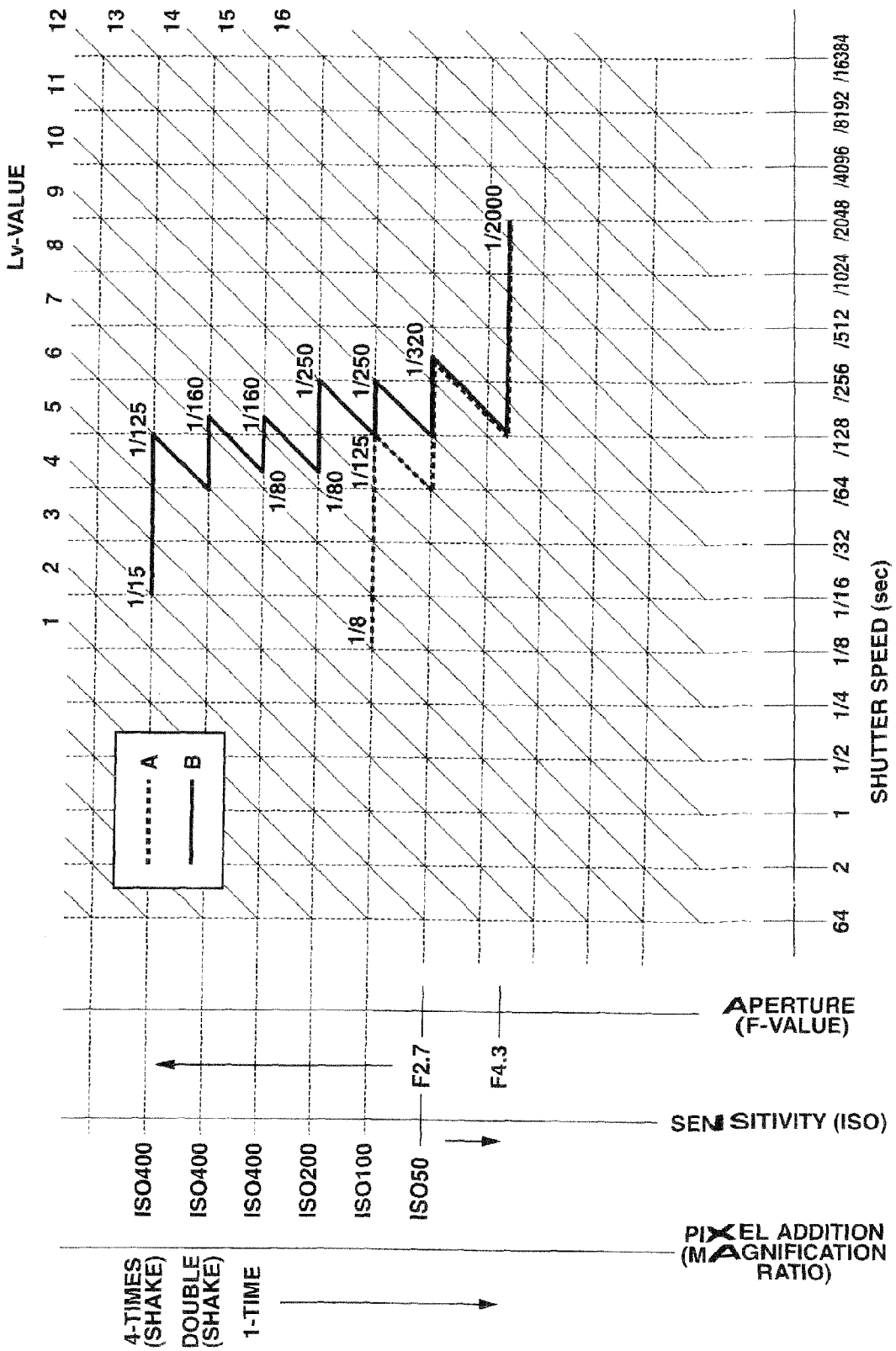
FIG. 2 is a view showing program diagrams stored in a flash memory.

Now, referring to FIG. 2, the program diagram 100 stored on the flash memory 17 will be described. FIG. 2 is a view showing the program diagram 100. Similarly to a well known diagram, the program diagram 100 represents setting information indicating plural shooting conditions required to obtain an appropriate exposure for shooting a subject under an arbitrary luminance state (Lv-value). But the program diagram 100 in the embodiment includes setting information relating to a pixel addition ratio in addition to setting information relating to a shutter release speed, aperture setting (F value), and ISO sensitivity. The pixel addition will be described later.

The program diagram 100 in the embodiment has a program diagram A for a normal mode, represented by broken line, and a program diagram B for a shake reducing mode, represented by a solid line. The program diagram A is used for shooting a still image in the normal mode, and the program diagram B is used for shooting a still image while the shake reducing mode is set on, which mode is previously prepared in the digital camera 1.

The program diagram A (broken line) for the normal mode represents a combination of the shooting conditions for setting ISO sensitivity (gain of the amplifier 8) to not larger than "100", i.e. to a sensitivity at which noises are reduced in an imaging signal, and as shown in FIG. 2, in the case where it is so dark as Lv-value is not larger than "9", the shutter release speed is set not higher than "1/64" for each Lv-value. Meanwhile, the program diagram B (solid line) for the shake reducing mode represents a combination of shooting conditions for setting the shutter release speed to a speed not lower than "1/64" as possible, i.e. to a speed higher than a speed at which hand shake occurs during a shooting operation, and with respect to the Lv-value, the ISO sensitivity increases up to the upper limit of "400", which is the maximum value that is allowed to be set, and the pixel addition ratio increases up to the upper limit of a "4 times", which is the maximum that is allowed to be set.

In the embodiment, ISO sensitivities "50" to "400" represented by the program diagram 100 are obtained by setting the gain of the programmable amplifier 8 to 8 db, 14 db, 20 db and 26 db. In the case where the gain of the programmable amplifier 8 is set to 26 db (ISO sensitivity 400) and the pixel addition ratio is set to a "double" and "4 times", a sensitivity is obtained, which is substantially the same as obtained when the gain of the programmable amplifier 8 is set to ISO sensitivities "800" and "1600".

The pixel addition ratio is represented by a value corresponding to the number of pixels to be added when an imaging signal is read out from CCD 6 in the image shooting operation. In the embodiment, in addition to a normal reading mode for reading out an imaging signal from CCD 6, a two-pixel addition mode and four-pixel addition mode are prepared. In the two-pixel addition mode, signal charges of two pixels are added in the vertical direction to read out the imaging signal, and in the four-pixel addition mode, signal charges of four pixels are added in the vertical and horizontal directions to read out the imaging signal. The pixel addition ratio of "double" is information for setting the read mode which indicates that the driving mode of CCD 6 should be set to the two-pixel addition mode, and similarly the pixel addition ratio of "4 times" is information for setting the read mode which indicates that the driving mode of CCD 6 should be set to the four-pixel addition mode.

Now, a method of reading out the imaging signal in the two-pixel addition mode and four-pixel addition mode will be described with reference to the drawings.

Figure 3A:
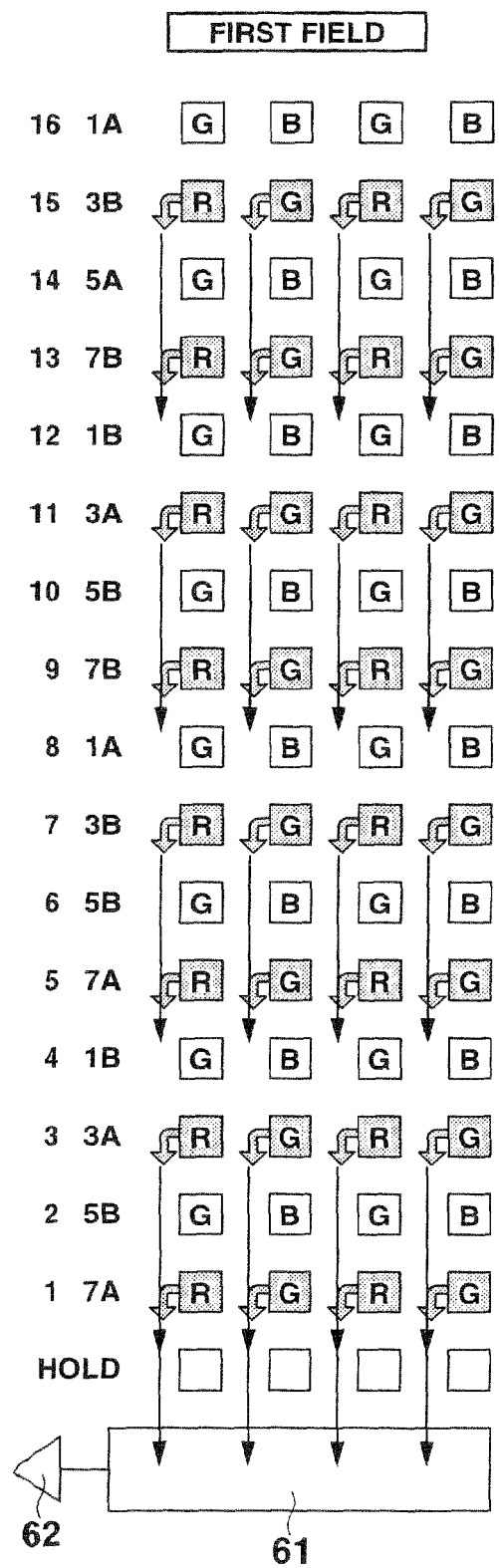
FIGS. 3A and 3B are schematic views of CCD for illustrating the principle of reading out an imaging signal in a two-pixel addition mode.
Figure 3B:
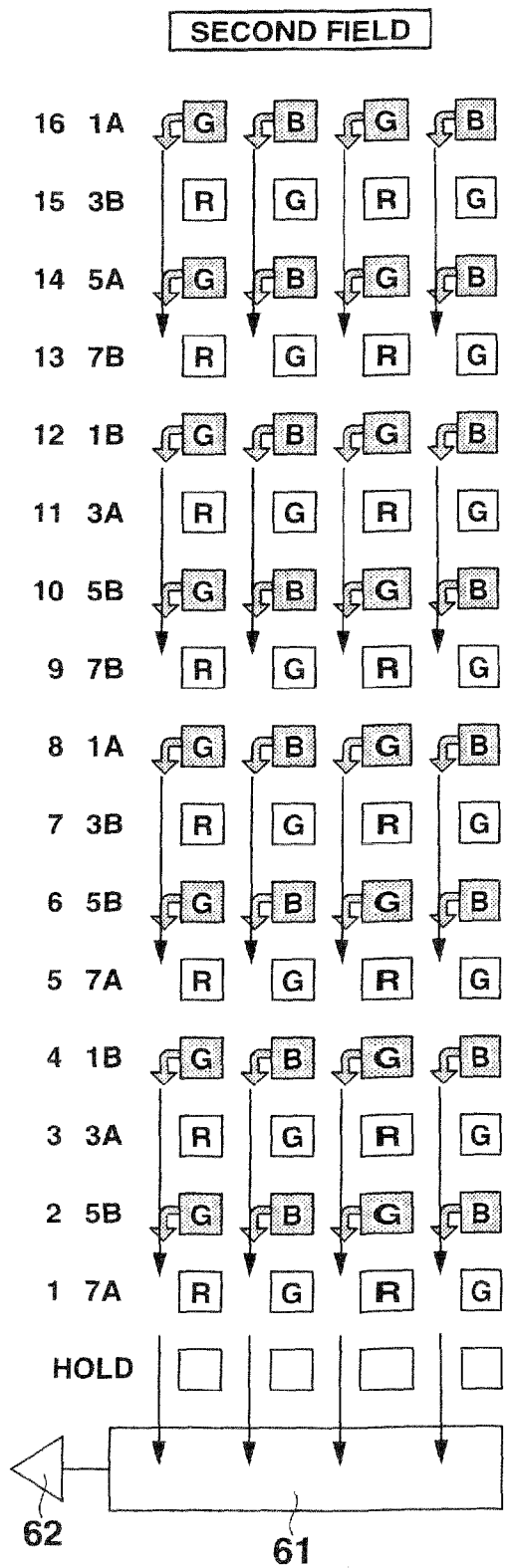

FIGS. 3A and 3B are schematic views of CCD 6, showing the principle of the method of reading out the imaging signal in the two-pixel addition mode. CCD 6 comprises a lot of optical sensing CCDs, i.e. pixels (R, G, B in FIGS. 3A and 3B), a hold storage portion HOLD having non optical sensing CCDs disposed in the horizontal direction, a horizontal transferring portion 61, a vertical transferring portion (not shown) for transferring a signal charge of each CCD in the vertical direction, and an output circuit 62. The normal read mode (nor shown) is for reading out signal charges of all the pixels (5 mega-pixels in the embodiment) from CCD 6 without adding any pixel in a general frame reading process.

The two-pixel addition mode is for reading out signal charges of one frame by a 4/8 line 2 fields, as shown in FIGS. 3A and 3B. More specifically, in the first field shown in FIG. 3A, only signal charges of odd lines (15, 13, 11, and so on) in the vertical direction are transferred in the vertical direction, and the hold storage portion HOLD holds the signal charges of one line only for a one-line transferring period to add signal-charges of two odd lines adjacent to each other, that is, signal charges of two pixel of the same color are added in the vertical direction and transferred to the horizontal transferring portion 61. Then, an odd line signal is read out, which includes signal charges of 2 lines each consisting of a pixel-color disposal (R, G, R, G, and so on) that are added in the vertical direction, and thereafter, the signal charges of all the odd lines are successively read out. In the second field shown in FIG. 3B, the signal charges of even lines (16, 14, 12, and so on) in the vertical direction are added in the vertical direction as in the similar manner to the first field, and an even line signal is read out, which includes signal charges of 2 lines each consisting of a different pixel-color disposal (G, B, G, B and so on) from the odd line that are added in the vertical direction, and thereafter, the signal charges of all the even lines are successively read out.

Figure 4:
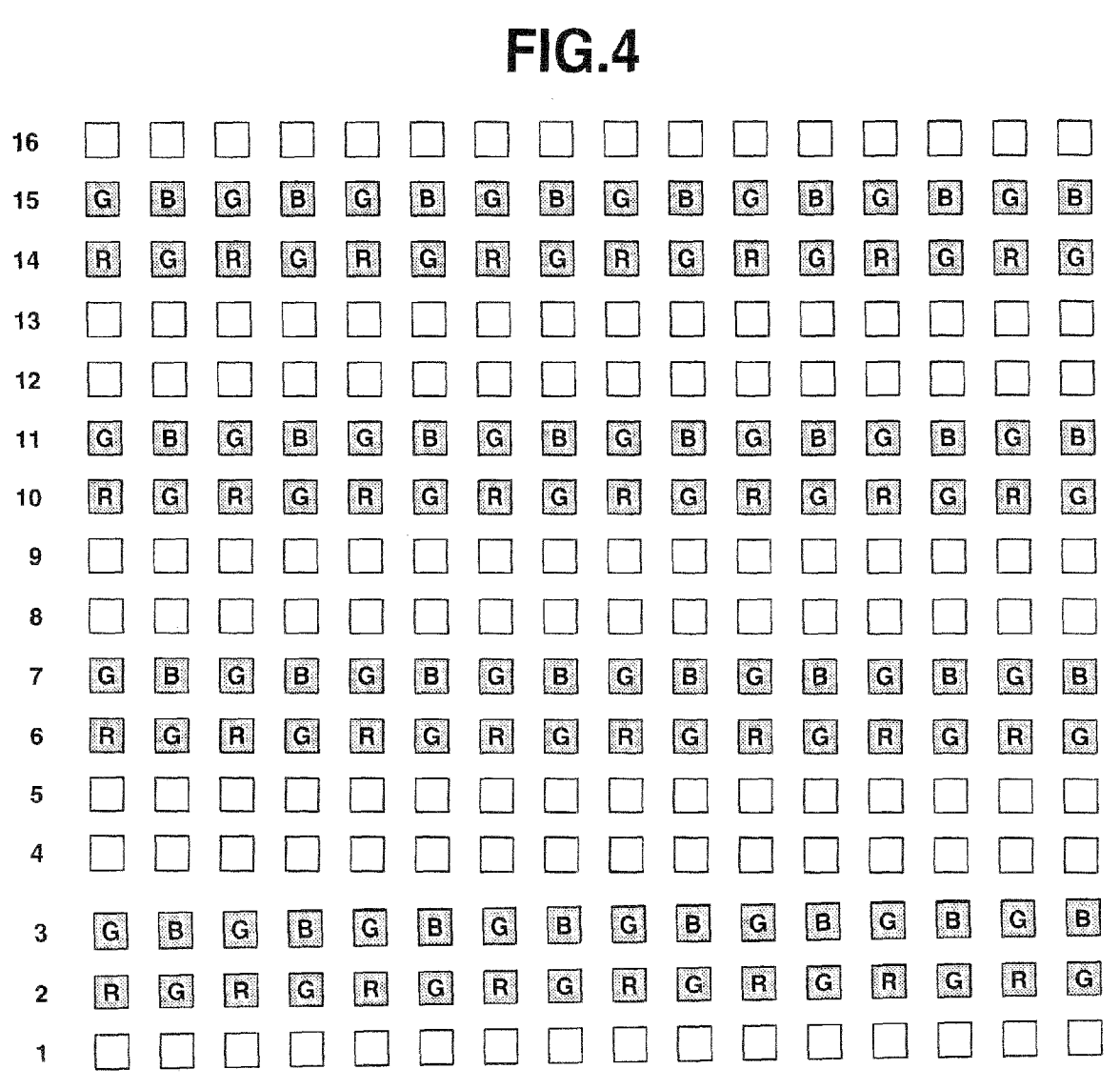

FIG. 4 is a view illustrating a conceptual diagram of the Bayer data consisting of the imaging signal read out from CCD 6, as described above. As shown in FIG. 4, in the two-pixel addition mode, the number of pixels in the vertical direction is one half (2.5 mega-pixels) of the whole of data, but Bayer data is obtained, which is reflected by pixel information of the total number of pixels and in which a total pixel value (luminance information) is amplified doubly. FIG. 4 is a view illustrating a relationship in position between the pixels (R, G, B) obtained by adding in the vertical direction as described above and pixels not obtained by adding in the vertical direction, but Bayer data including only the obtained pixels (R, G, B) is temporarily stored on SDRAM 13. A pixel position of the pixels (R, G, B) subjected to the two-pixel adding process as shown in FIG. 4 locates at the center of gravity of two pixels to be added.

Figure 5A:
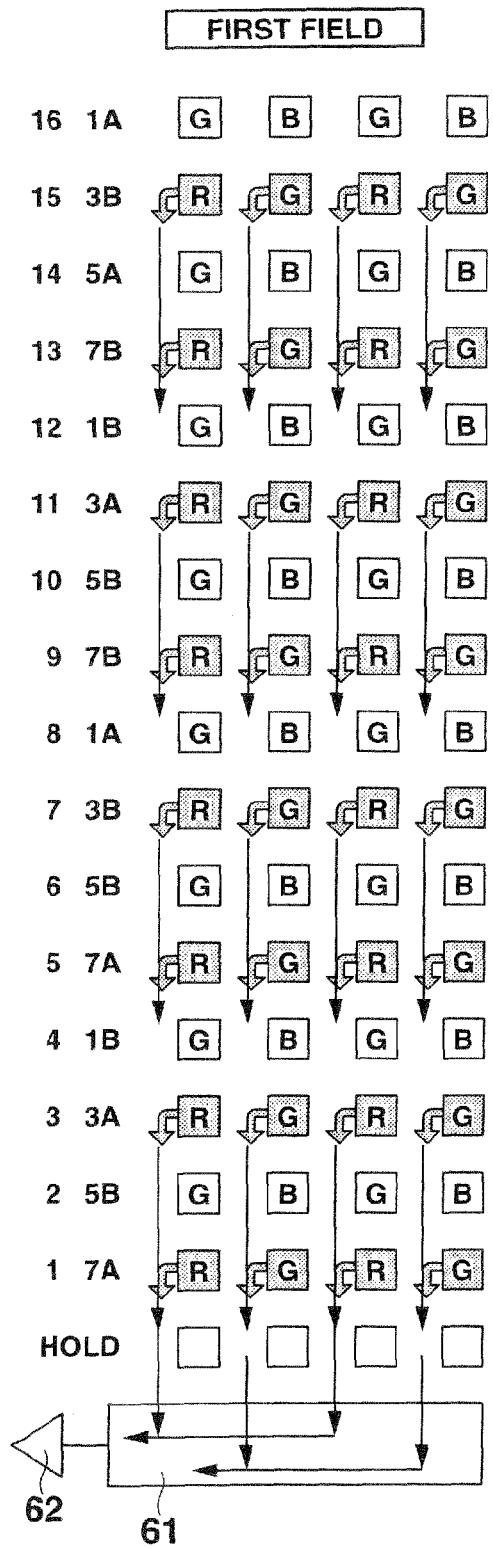
FIGS. 5A and 5B are schematic views of CCD for illustrating the principle of reading out an imaging signal in a four-pixel addition mode.
Figure 5B:
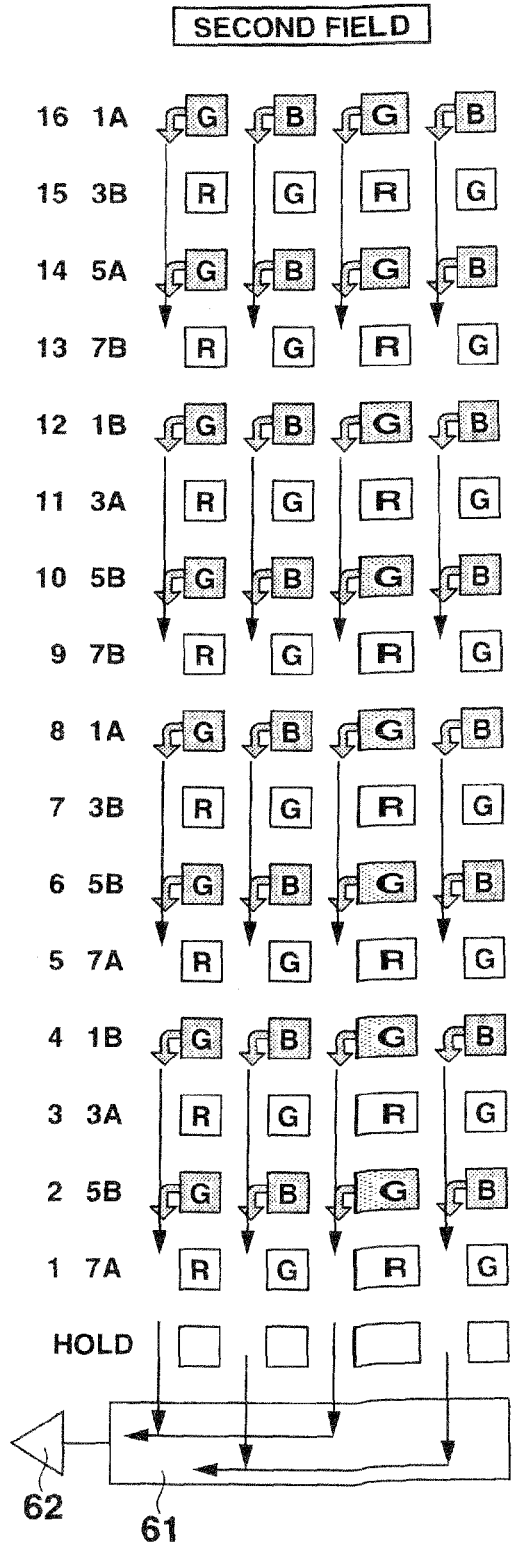

FIGS. 5A and 5B are schematic views of CCD 6, showing the principle of the method of reading out the imaging signal in the four-pixel addition mode. Similarly to the two-pixel addition mode, the four-pixel addition mode is for reading out signal charges of one frame by a 4/8 line 2 fields, as shown in FIGS. 5A and 5B.

More specifically, in the first field shown in FIG. 5A, only signal charges of odd lines (15, 13, 11, and so on) in the vertical direction are transferred in the vertical direction, and the hold storage portion HOLD temporarily holds the signal charges of one line only for a one-line transferring period to add signal charges of two odd lines adjacent to each other, that is, signal charges of two pixels of the same color are added in the vertical direction (vertical addition) and transferred to the horizontal transferring portion 61. In the horizontal transferring portion 61, at the timing when the signal charges of two pixels added in the vertical direction are transferred, the following signal charges added in the vertical direction are shifted by 2 pixels in the horizontal direction to be added to the prior signal charges (horizontal addition). More particularly, the signal charges of 2 lines each consisting of a same pixel-color disposal (R, G, R, G, and so on) are added to each other in the vertical direction (vertically added signal charges), and the signal charges of 2 pixels of the same color, located every other pixel position on the same line, are added in the horizontal direction (horizontally added signal charges). Then, an odd line signal is made up of the vertically added signal charges with the horizontal signal charges added thereto, and is read out. Thereafter, the signal charges of all the odd lines are successively read out.

Similarly, in the second field shown in FIG. 5B, the vertical addition and the horizontal addition are effected on the signal charges of even lines (16, 14, 12, and so on) in the vertical direction, that is, the signal charges of 2 lines each consisting of a different pixel-color disposal (G, B, G, B and so on) from the odd line are added in the vertical direction (vertically added signal charges), and the signal charges of 2 pixels of the same color, located every other pixel position on the same line, are added in the horizontal direction (horizontal added signal charges). An even line signal is read out, that is made up of the vertically added signal charges with the horizontal added signal charges added thereto. Thereafter, the signal charges of all the even lines are successively read out.

Figure 6:
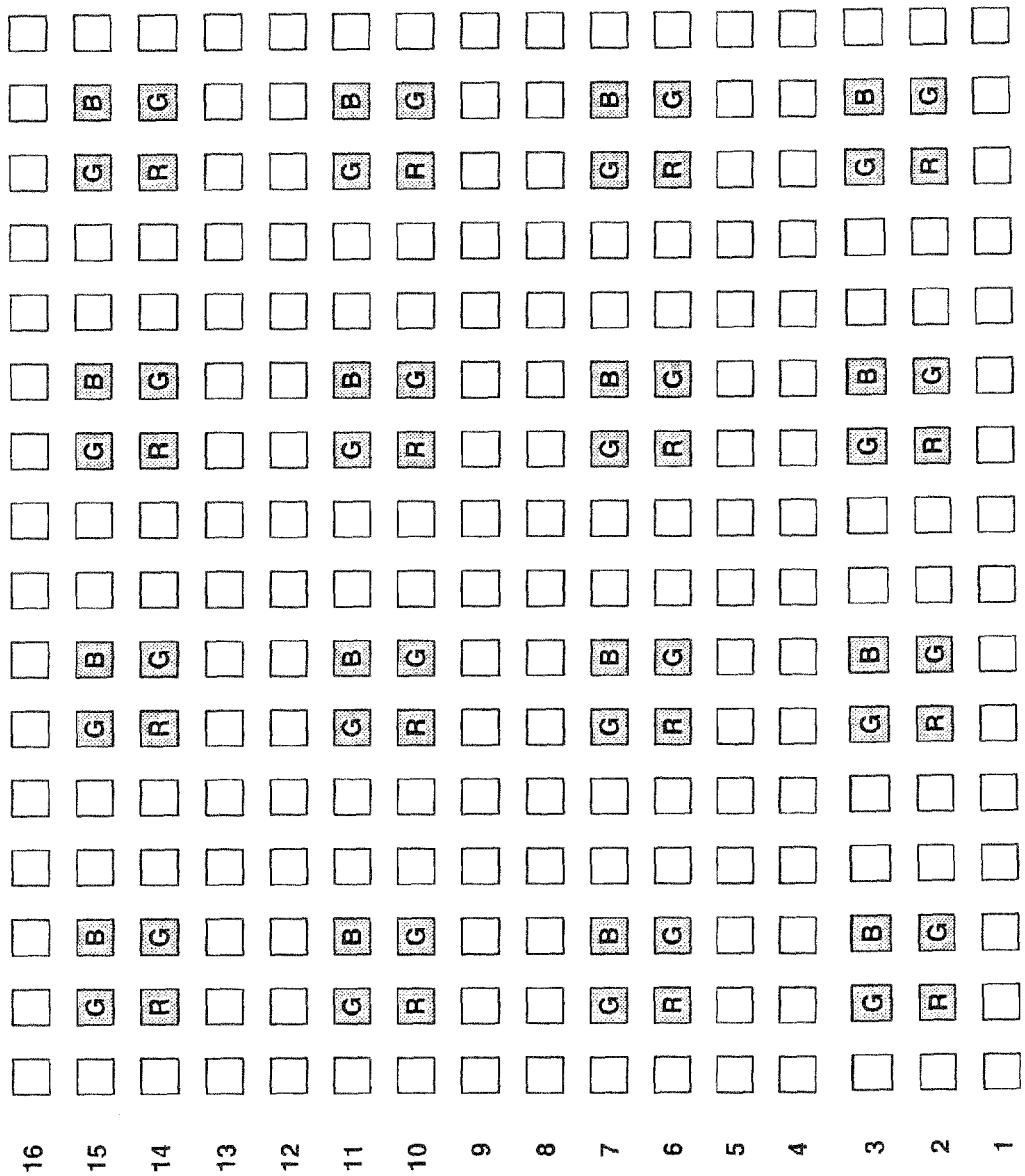
FIG. 6 is a schematic view illustrating Bayer data consisting of an imaging signal read out in the four-pixel addition mode.

FIG. 6 is a view illustrating a conceptual diagram of the Bayer data consisting of the imaging signal read out from CCD 6, as described above. As shown in FIG. 6, in the four-pixel addition mode, the number of pixels in the vertical and horizontal direction is one half (1.25 mega-pixels) of the whole of data, but Bayer data is obtained, which is reflected by pixel information of the total number of pixels and in which a total pixel value (luminance information) is amplified 4-times. FIG. 6 is a view illustrating a relationship in position between the pixels (R, G, B) obtained by the vertical addition and horizontal addition as described above and pixels not obtained by the vertical addition and horizontal addition, but Bayer data including only the obtained pixels (R, G, B) is temporarily stored on SDRAM 13. A pixel position of the pixels (R, G, B) subjected to the four-pixel adding process as shown in FIG. 4 locates at the center of gravity of two pixels to be added.

Figure 7:
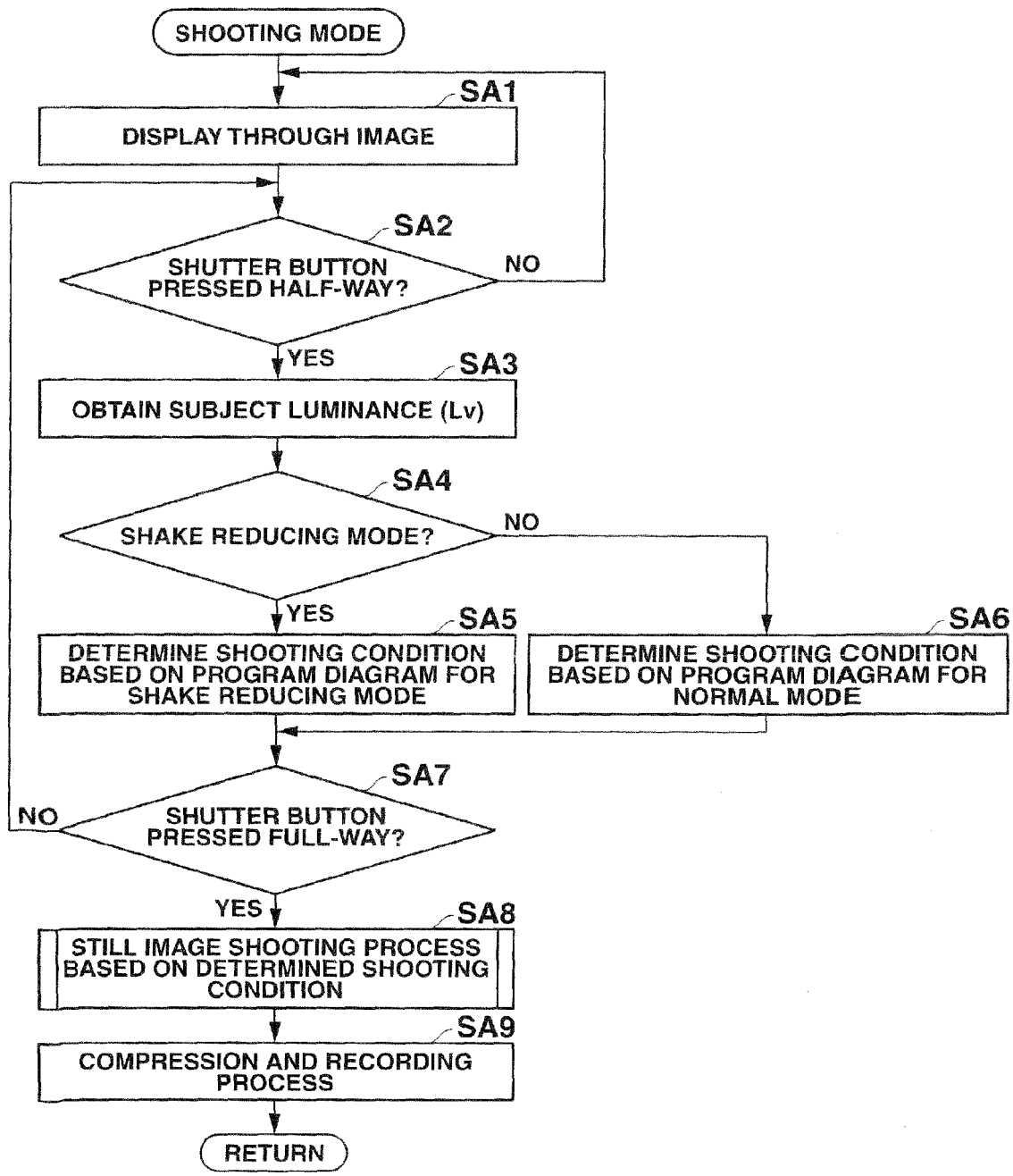
FIG. 7 is a flow chart of processes performed in a still image shooting mode.

Now, operation of the digital camera 1 of the configuration described above will be described with reference to the drawings. FIG. 7 is a flow chart showing processes performed by CPU 5 when the still image shooting mode is set in the digital camera 1 by user's operation of the mode selecting switch. In the flow chart of FIG. 7, description of AF control and AWB control operation will be omitted.

In the still image shooting mode, CPU 5 makes CCD 6 execute an imaging operation at a timing of a predetermined through rate, and generates a through image using image data obtained in the imaging operation of CCD 6, and starts displaying the through image on the liquid crystal monitor 15 at step SA1.

Further, while displaying the through image, CPU 5 receives signals depending on various key operations, but is capable of setting the shake reducing mode on in response to the user's operation. Meanwhile, with respect to the through images successively obtained, AE process is performed according to the program diagram for displaying a through image, whereby through images are displayed appropriately.

When it is determined that the shutter release button has been pressed half-way while a through image is being displayed (YES at step SA2), CPU 5 determines a subject luminance (Lv-value) based on luminance information (luminance data or signal) of image data read out or obtained during the prior imaging operation at step SA3. Further, CPU 5 judges at step SA4 whether or not the shake reducing mode has been set in the digital camera 1. When it is determined that the shake reducing mode has not been set (NO at step SA4), the shooting condition corresponding to the subject luminance (Lv-value) obtained at step SA3 is determined on the basis of the program diagram A (broken line) of the program diagram 100 for the normal mode at step SA6. Meanwhile, when it is determined that the shake reducing mode has been set (YES at step SA4), the shooting condition corresponding to the subject luminance (Lv-value) obtained at step SA3 is determined on the basis of the program diagram B (solid line) for the shake reducing mode at step SA5.

Thereafter, when it is determined that the shutter release button has not pressed full-way (NO at step SA7), the operation of CPU 5 returns to step SA2, and when it is determined at step SA2 that the shutter release button is kept pressed half-way, the processes at step SA3 to SA6 are repeatedly performed. When it is determined that the shutter release button has not been pressed half-way (NO at step SA2), CPU 5 waits for the shutter half-way pressing operation. When it is determined that the shutter release button has been pressed full-way without being released from a half-way pressed state (YES at step SA7), CPU 5 performs at the step SA8 the still image shooting process with the shooting condition determined last to generate image data to be recorded, and compresses the generated image data to record the same data on the external memory 16 at step SA9. Thereafter, CPU 5 returns to step SA1 and performs the processes described above repeatedly.

Figure 8:
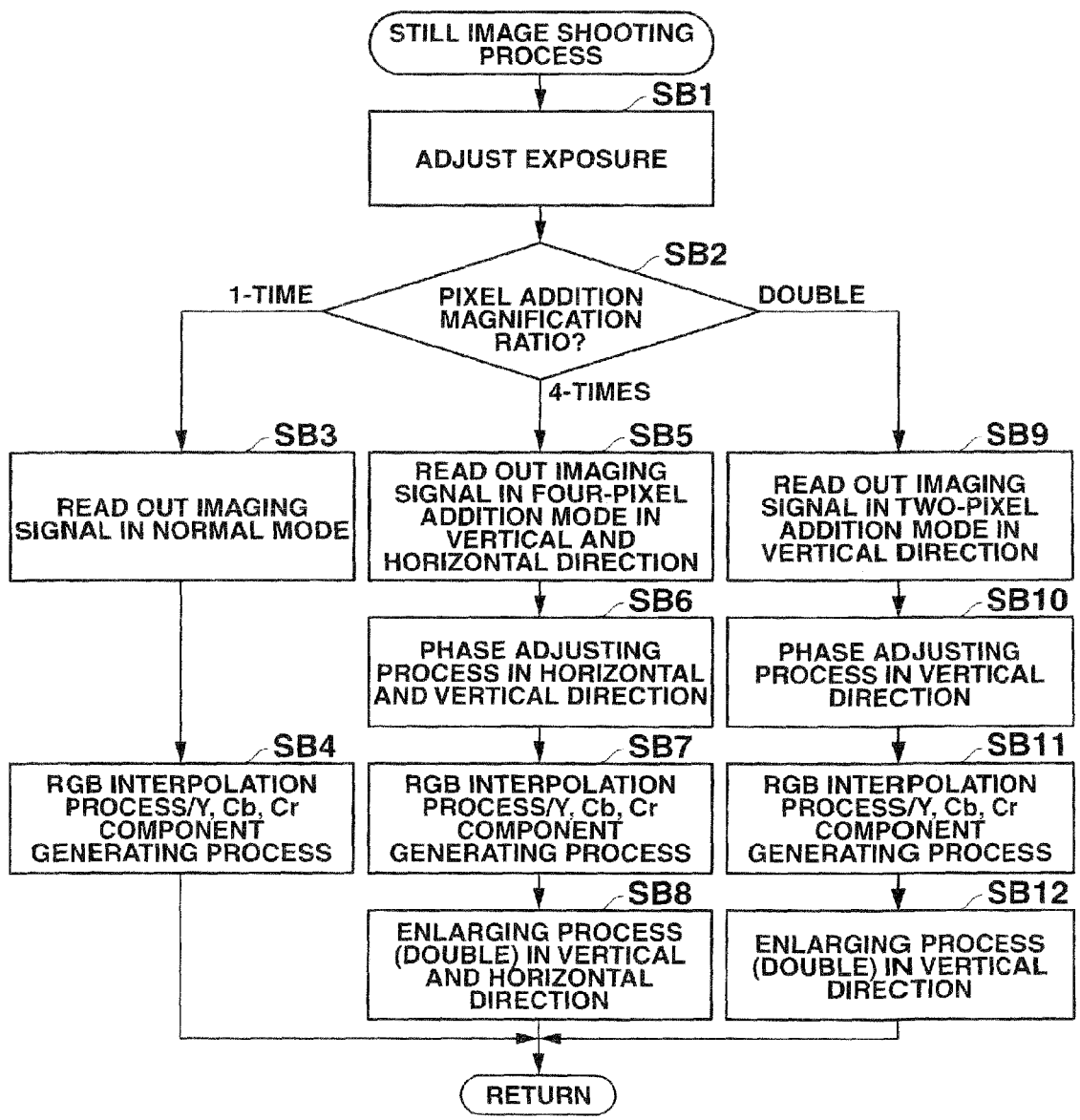
FIG. 8 is a flow chart of a still image shooting process performed in a still image shooting mode.

Now, the still image shooting process will be described in detail. FIG. 8 is a flow chart of the still image shooting process performed by CPU 5 at step SA8 in FIG. 7. CPU 5 adjusts, at step SB1, an amount of exposure on CCD 6 based on the shutter speed and the aperture (F value) given by the shooting condition determined at the time of image shooting, and executes the following processes at the pixel addition ratio given by the shooting condition.

A process will be described, which is performed when the pixel addition ratio has been set to "1" at step SB2, this is, when the shake reducing mode has not been set and the subject luminance (Lv-value) is not less than "8". In this case, regardless of the shake reducing mode, an imaging signal consisting of signal charges of all the pixels on CCD 6 is read out from CCD 6 in the normal reading mode with the programmable gain amplifier 8 set to a gain corresponding to ISO sensitivity given by the shooting condition determined at the image shooting (step SB3). Then, the A/D converter 9 executes A/D converting process on the imaging signal (Bayer data) to generate a digital imaging signal. The image processing circuit 12 executes RGB interpolation process on the digital imaging signal to generate RGB color component data (hereafter, RGB data) for each pixel on the basis of color component data which target pixels do not have, used as a means of pixel values of surrounding pixels having the color component data. Further, the image processing circuit 12 executes YUV conversion process on RGB color component data to generate YUV data for each pixel, including a luminance component (Y) and color-difference components (Cb, Cr) (step SB4).

A process will be described, which is performed when it is determined at step SB2 that the pixel addition ratio has been set to "4 times", that is, when the shake reducing mode has been set and the subject luminance (Lv-value) is not larger than "6". In this case, with the gain of the programmable gain amplifier 8 set to 26 db (ISO sensitivity 400), CCD 6 is driven in the four-pixel addition mode to read out an imaging signal consisting of signal charges of 1.25 mega pixels of one half of the number of pixels respectively in the vertical and horizontal direction at step BS5.

The imaging signal (Bayer data) read out from CCD 6 is subjected to A/D converting process by A/D converter 9 to obtain a digital imaging signal (Bayer data), and the digital imaging signal is further subjected to a phase adjusting process in the vertical and horizontal direction, whereby a new Bayer data is obtained at step SB6.

The above process will be described with reference to the drawings. Each pixel included in Bayer data obtained by for—pixel addition operation locates at the gravity of original four pixels added in a pixel space on the light sensing surface of CCD 6. Therefore, distances between the pixels are not equivalent as shown in FIG. 6. When RGB interpolation process is executed on Bayer data, in other words, when, assuming that the target pixel 200 is R-pixel, G-component data of the target pixel is generated based on four B-pixels locating in the vicinity and B-component data of the target pixel is generated based on four B-pixels locating in the vicinity, true G-component data and B-component data can not be obtained. Therefore, phases of color components are shifted, and jaggies appear on the final image.

Figure 10:
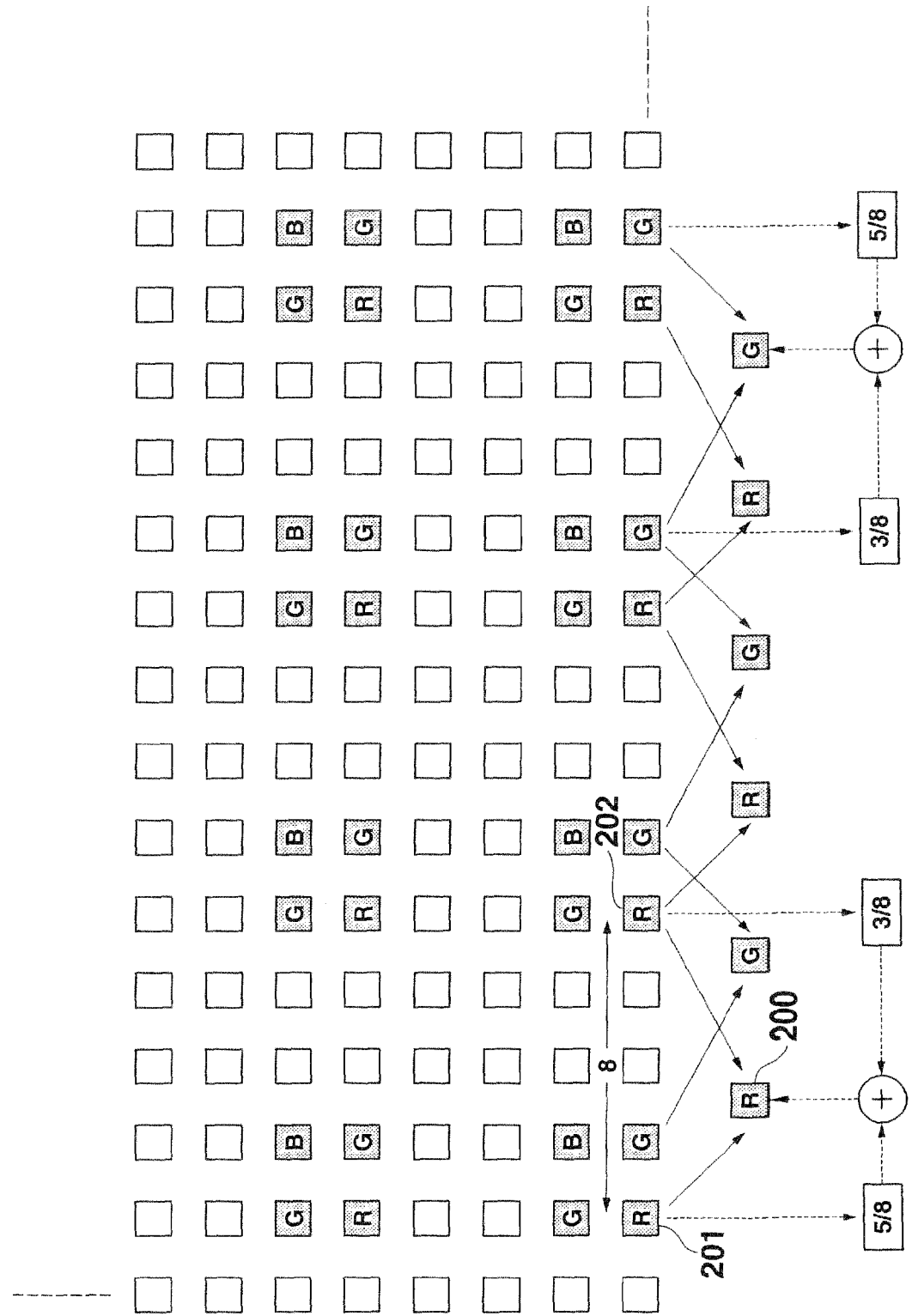
FIG. 10 is a view illustrating a relationship between the target pixel and adjacent pixels locating in the horizontal direction, in RGB interpolation process executed when a pixel addition factor has been set to "4 times".

The phase adjusting process is for converting a pixel value of each pixel included in Bayer to a pixel value of the pixel keeping equivalent distances to adjacent pixels in the pixel space to reform Bayer data, whereby jaggy occurrence is prevented in the final image. FIG. 10 is a schematic view illustrating Bayer data subjected to the phase adjusting process in the horizontal direction. A new pixel of a color is made to locate at a position corresponding to three eighth of the distance between two adjacent pixels of such color on the same horizontal line. Then, all the distance between the new pixels are made equivalent. And the pixel value of the new pixel can be obtained as a weighted average of the pixel values of the original pixels of the same color located at both sides of the such new pixel, calculated depending on the respective distances to the new pixel.

Figure 11:
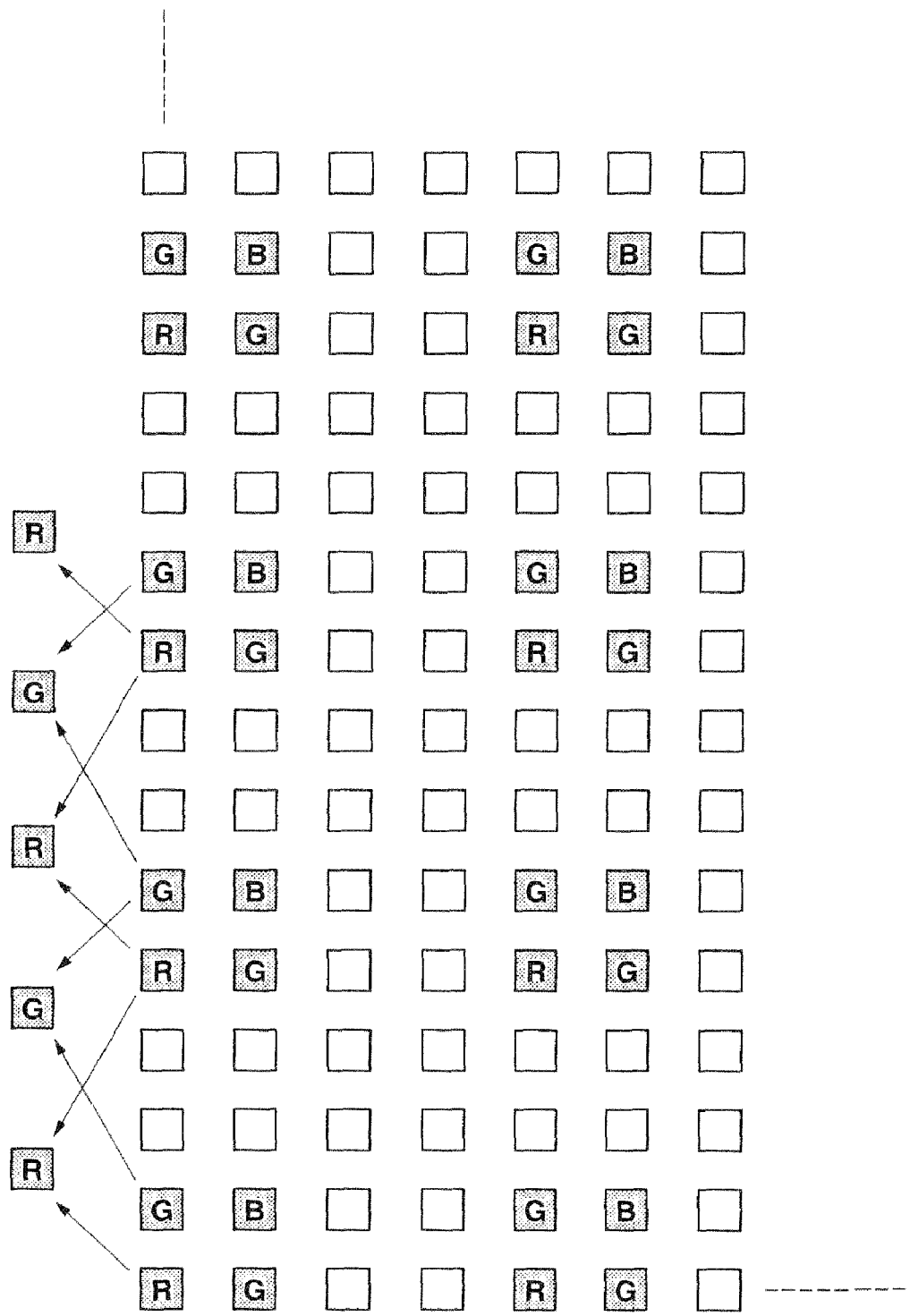
FIG. 11 is a view illustrating a relationship between the target pixel and adjacent pixels locating in the vertical direction, in RGB interpolation process executed when a pixel addition factor has been set to "4 times".

For example, as shown in FIG. 10, a new R-pixel 200 is disposed at a position between R-pixels 201 and 202, such position being apart from R-pixel 201 by three eighth of the distance between R-pixels 201 and 202 and also apart from R-pixel 202 by five eighth of the distance. The pixel value of the new R-pixel 200 is set to a weighted average of the pixel values of R-pixels 201 and 202 calculated based on their respective distances to the new R-pixel 200 (sum of the product of a value of R-pixel 201 and five eighth and the product of a value of R-pixel 202 and three eighth), and Bayer data is reproduced using data of new R-pixels disposed as described above. FIG. 11 is a schematic view illustrating Bayer data subjected to the phase adjusting process in the vertical direction. Data of new pixels is obtained in the vertical direction in the similar manner to the horizontal direction, and Bayer data is reproduced using such data.

Bayer data reproduced using the pixels subjected to the phase adjusting process is further subjected to RGB interpolation process to generate RGB color component data (RGB data). The generated RGB data is subjected to YUV conversion process to generate YUV data for each pixel, including a luminance component (Y) and color-difference components (Cb, Cr) at step SB7. Further, the generated YUV data is subjected to an enlarging process (twice) in the vertical and horizontal directions to interpolate pixels lost in the four-pixel addition, whereby image data to be recorded is produced, which consists of the same number of pixels (5 mega-pixels) as the image data produced with the pixel addition ratio set to "1" at step SB8. The pixels are interpolated in the enlarging process in the same manner as in the well known digital zoom operation (linear interpolation with adjacent pixels).

A process will be described, which is performed when the pixel addition ratio has been set to "2" at step SB2 in FIG. 8, this is, when the shake reducing mode has been set and the subject luminance (Lv-value) is between "6" and "7". In this case, CCD 6 is driven in the two-pixel addition mode with the gain of the programmable gain amplifier 8 set to 26 db (ISO sensitivity: 400) to read out signal charges of 2.5 mega-pixels (the number of pixels in the vertical direction is one half of the total number of pixels in the vertical direction) at step SB9.

The read out imaging signal (Bayer data) is A/D converted into a digital imaging signal. The digital imaging signal is subjected to the phase adjusting process in the vertical direction to generate new Bayer data at step SB10. The phase adjusting process is performed on the new Bayer data in the similar manner to the phase adjusting process performed in the vertical direction with the pixel addition ratio set to "4" as described above.

Bayer data subjected to the phase adjusting process is further subjected to RGB interpolation process to generate RGB color component data (RGB data). The generated RGB data is subjected to YUV conversion process to generate YUV data for each pixel, including a luminance component (Y) and color-difference components (Cb, Cr) at step SB11. Further, the generated YUV data is subjected to an enlarging process (twice) in the vertical direction, whereby pixels lost in the two-pixel addition are interpolated to produce image data to be recorded, which has the same number of pixels (5 mega-pixels) as the image data produced with the pixel addition ratio set to "1" at step SB12. The pixels are interpolated in the enlarging process in the same manner as in the well known digital zoom operation (linear compensation from adjacent pixels).

At the time when CPU 5 has finished performing either of the process at step SB4, SB8 or SB12, the still image shooting process has been completed, and CPU 5 returns to the process shown in FIG. 7, in which YUV data generated in either of the processes described above is compressed, whereby image data is generated and recorded on the external memory 16.

In the above still image shooting process, the imaging signal read out from CCD 6 is subjected to the pixel addition process (two-pixel addition, four-pixel addition), which process causes phase shifts of color components in RGB data to be subjected to RGB interpolation process. Therefore, Bayer data is subjected to the phase adjusting process to prevent occurrence of phase shifts in the color components of RGB data, whereby new Bayer data is reproduced. Then, RGB interpolation process is executed on Bayer data newly reproduced as described above. But the phase adjusting process may be executed during RGB interpolation process.

Figure 12:
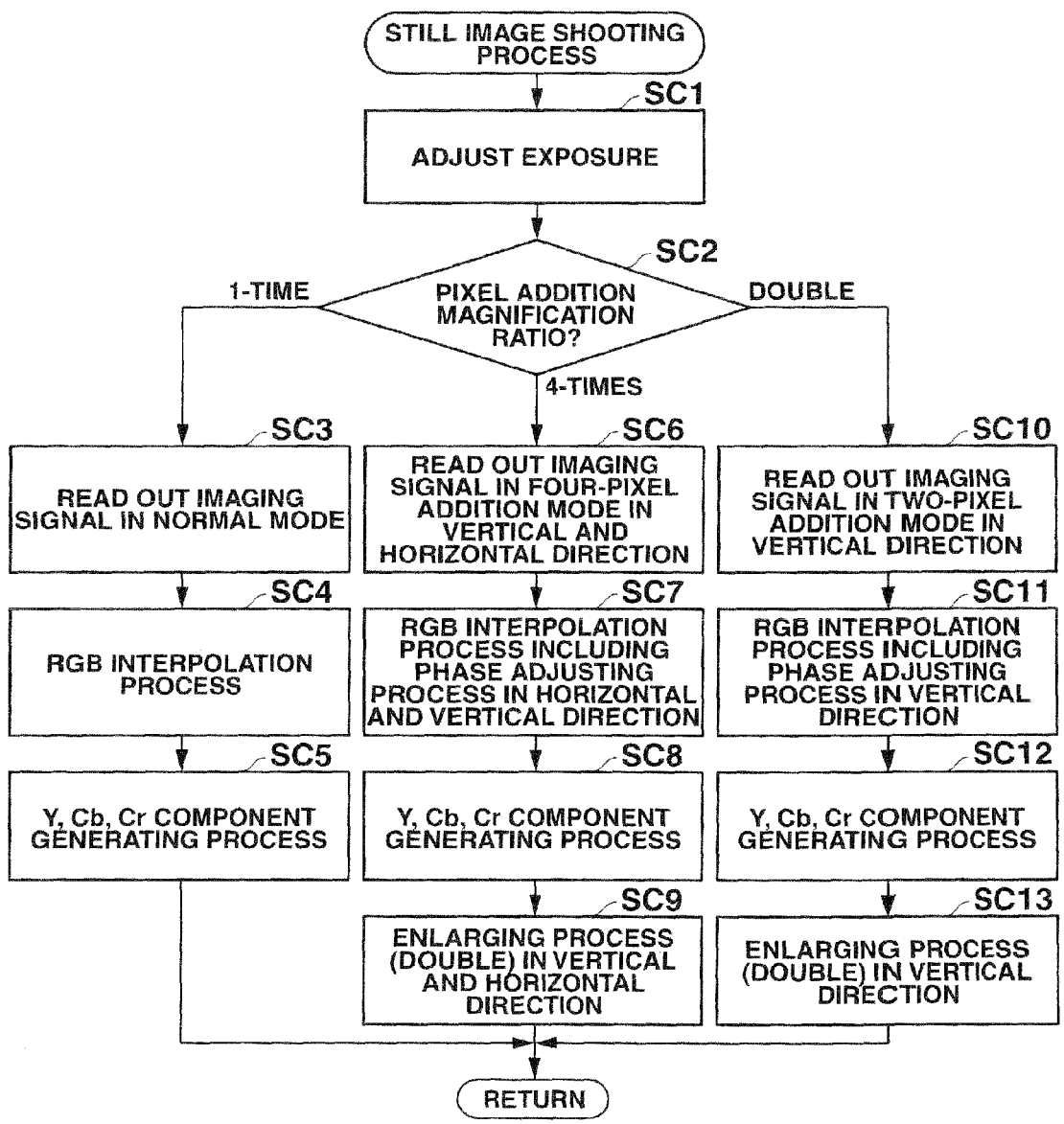
FIG. 12 is a flow chart corresponding to that of FIG. 8, showing a modified still-image shooting process performed in a still image shooting mode.

FIG. 12 is a flow chart showing a modified still image shooting process, which correspond to the flow chart shown in FIG. 8.

In the modified still image shooting process, CPU 5 adjusts, at step SC1, an amount of exposure on CCD 6 based on the shutter speed and the aperture (F-value) given by the shooting condition determined at the time of image shooting, and executes the following processes at the pixel addition ratio given by the shooting condition.

When it is determined at step SC2 that the pixel addition ratio has been set to "1", the same processes at steps SB3 and SB4 in FIG. 8 are performed at steps SC3 and SC4 in FIG. 12, and CPU 5 makes the image processing unit 12 generate YUV data at step SC5.

Now, a process will be described, which is performed when it is determined at step SC2 that the pixel addition ratio has been set to "4". In this case, CCD 6 is driven in the four-pixel addition mode with the gain of the programmable amplifier 8 set to 26 db (ISO sensitivity: 400) and an image signal is read out at step SC6, which comprises signal charges of 1.25 mega-pixels (consisting of one half of the total number of pixels respectively in the vertical and horizontal direction).

The imaging signal is converted into a digital imaging signal (Bayer data), and the digital imaging signal (Bayer data) is subjected to RGB interpolation process including the phase adjusting process in the horizontal and vertical directions at step SC7. Different from the general interpolation process performed at step SC4, in the current RGB interpolation process, the color component data that the target pixel does not have is given by a weighted average calculated from pixel values of pixels locating around the target pixel depending on their distances to the target pixel, but not by a simple average of the pixel values of the pixels having such color component data, located around the target pixel.

Figure 9:
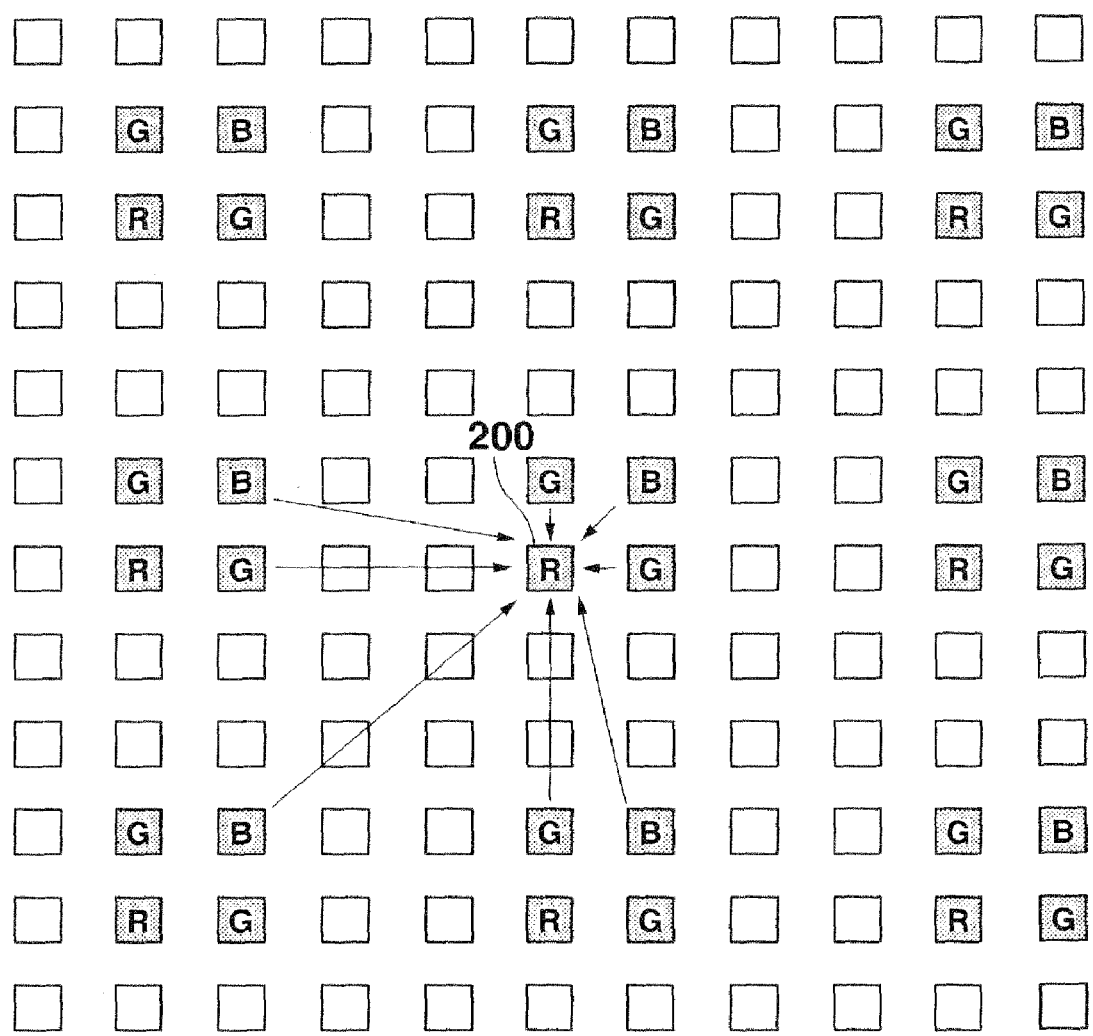
FIG. 9 is a view illustrating a target pixel in RGB interpolation process executed when a pixel addition factor has been set to "4 times".

More specifically, if the target pixel is R-pixel having R component as shown in FIG. 9, G component data is generated based on four G-pixels locating around R-pixel and B component data is also generated based on four B-pixels locating around R-pixel. In this case, each pixel is read out in the four-pixel addition mode described above, and distances between the target pixel (r-pixel) and adjacent four pixels (G-pixels or G-pixels) are not equivalent in positional relationships between the pixels (positional relationship between gravity centers of the four pixels) on the light sensing surface of CCD 6, as shown in FIG. 9. Therefore, in the case where an average of pixel values of the pixels locating around the target pixel is used as the pixel value of the target pixel, phase shifts occur in color components, yielding jaggies in the final image. In the above process, pixel values of four pixels locating around the target pixel are multiplied by weighting ratios depending on distances to the target pixel, respectively, and an average of the weighted pixel values of the four pixels is used as the pixel value of the target pixel.

More particularly, the pixel value of a target value (pixel 200) will be described in detail referring to FIG. 10. When a distance between two pixels (R-pixels 201, 202) locating next to the target pixel 200 on the same horizontal line is "8", and a horizontal distance between R-pixel 201 and the target pixel 200 is "3", and a horizontal distance between R-pixel 202 and the target pixel 200 is "5", a weighting factor for the pixel (R-pixel 201) at the left side is set to "⅝" and a weighting factor for the pixel (R-pixel 202) at the right side is set to "⅜". The pixel values of the pixels 201, 202 are multiplied by the weighting ratios, respectively to obtain weighted pixel values. An average of these weighted pixel values is calculated and used as the pixel value of the target pixel 200. In the above explanation, the pixel values are weighted only in the horizontal direction, but actually pixel values are weighted not only in the horizontal direction but also in the vertical direction in the same manner as in the horizontal direction.

Then, RGB data for each pixel generated in the RGB interpolation process including the phase adjusting process is subjected to YUV conversion process to generate YUV data for each pixel at step SC8. Further, the generated YUV data is subjected to the enlarging process (twice) in the vertical and horizontal direction, whereby pixels lost in the four-pixel addition are interpolated to produce image data to be recorded at step SC9, which has the same number of pixels (5 mega-pixels) as the image data produced with the pixel addition ratio set to "1".

Now, a process will be described, which is performed when it is determined at step SC2 that the pixel addition ratio has been set to "double" or "2 times". CCD 6 is driven in the two-pixel addition mode with the gain of the programmable gain amplifier 8 set to 26 db (ISO sensitivity: 400) to read out an imaging signal, that is, signal charges of 2.5 mega-pixels (the number of pixels in the vertical direction is one half of the total number of pixels in the vertical direction) at step SC10.

The read out imaging signal (Bayer data) is A/D converted into a digital imaging signal. The image processing unit 12 performs RGB interpolation process including the phase adjusting process on the digital imaging signal (Bayer data) at step SC11. Different from the RGB interpolation process performed at step SC7, in the current RGB interpolation process at step SC11, when the color component data that the target pixel does not have is obtained from pixel values of pixels (adjacent pixels) locating around the target pixel and having such color component data, the pixel values of the adjacent pixels are weighted respectively with the weighting factors depending on their distances to the target pixel only in the vertical direction, and an average of the weighted pixel values of the adjacent pixels is used as the pixel value of the target pixel, whereby RGB data for each pixel with no phase shift in color component is generated.

Then, RGB data for each pixel generated in the RGB interpolation process including the phase adjusting process is subjected to YUV conversion process to generate YUV data for each pixel at step SC12. Further, the generated YUV data is subjected to the enlarging process (twice) in the vertical direction, whereby pixels lost in the two-pixel addition are interpolated to produce image data to be recorded at step SC13, which has the same number of pixels (5 mega-pixels) as the image data produced with the pixel addition ratio set to "1". In the modified embodiment, jaggies are prevented from appearing in the final image.

As described above, in the digital camera 1 according to the embodiments of the invention, when the shake reducing mode has been set, an appropriate exposure is secured by amplifying the photographed image luminance by means of the two-pixel addition or four-pixel addition, even though the subject luminance is such that the appropriate shutter release speed for the subject luminance is lower than a controlled shutter release speed at which a hand shake or a subject shake is expected in the normal shooting mode. Therefore, by keeping the shutter release speed in a higher range, deterioration in image quality due to hand shake or subject movement is reduced during the still image shooting operation. As the result, a digital camera is available, which is provided with a shake reducing function of a high reliability.

Further, a hand shake due to a camera shake and/or an image shake due to subject movement should occur while shooting a subject in a dark place as well as in a bright light place, a sharp image can be obtained with aid of the shake reducing function according to the invention.

Since the two-pixel addition and/or four-pixel addition amplifies luminance of the imaging signal, allowing high shutter speeds, image quality is not deteriorated unlike with the case where the gain of the programmable gain amplifier 8 is raised to allow high shutter speeds.

When a subject is shot under bright light, the two-pixel addition or four-pixel addition is not performed, and image data of all the pixels is read out from CCD 6. Therefore, the number of pixels is not reduced uselessly, and quality of a photographed image is not deteriorated.

In the embodiment of the invention, the pixel addition mode (a mode of reading out an imaging signal from CCD 6 in the embodiment) is selected depending on the subject luminance (Lv value) at the time of shooting the subject, but the pixel addition mode may be selected depending on the shutter speed determined by AE control.

In the embodiment, pixel addition (two-pixel addition or four-pixel addition) for the image picked up by CCD 6 is executed in CCD 6 when the imaging signal is read out from CCD 6, but the similar pixel addition may be executed for image data output from CCD 6 by using arbitrary hardware or computer software for CPU 5.

The pixel addition is not always necessary to be executed for pixels in Bayer data, but may be executed for RGB data which has been subjected to RGB interpolation process and for Y data, Cb data and Cr data generated by YUV conversion process.

Due to pixel addition, phase shifts occur in color components of RGB data which has been subjected to RGB interpolation process, and the phase adjustment for preventing occurrence of such phase shifts is executed before the RGB interpolation process is executed on RGB data as in the embodiment of the invention, but the phase adjustment may be executed during RGB interpolation process as in the modified embodiment shown in FIG. 12. In the case where the phase adjustment is executed on Bayer data before RGB interpolation process is performed, RGB interpolation process may be made simple and an interpolation processing circuit and an interpolation processing program, which are previously prepared, may be used without modifying them. Further, in the case where the phase adjustment is executed during RGB interpolation process as in the modified embodiment, a phase adjusting circuit and/or a phase adjusting program which are used only for reconstructing Bayer data are not required.

When the four-pixel addition is effected on the imaging signal, the phase adjustment is executed on the same signal in the vertical direction and horizontal direction, but it may be allowed to execute the phase adjustment only either in the vertical direction or in the horizontal direction. But it is clear that an image of higher quality may be obtained by the phase adjustment executed both in the vertical and horizontal direction.

The pixel addition mode (in the embodiment, a mode in which the imaging signal is read out from CCD 6) is automatically switched depending on the subject luminance (Lv value) at the time of shooting the subject, but it may be possible to allow the user to select the pixel addition mode manually according to his or her need.

Further, the pixel addition mode (in the embodiment, a mode in which the imaging signal is read out from CCD 6) is switched depending on the subject luminance (Lv value) at the time of shooting the subject, but it may be possible to switch the pixel addition mode depending on the shutter speed determined once by AE control.

In the embodiment of the invention, an image size (pixel size) of a photographed image for a recording purpose is fixed to the maximum size which can be obtained by CCD 6. In the conventional digital cameras, plural image sizes which can be recorded are prepared and the user can select one size according to his or her desire. Therefore, in the embodiment of the invention, UV data is enlarged in the still image shooting process (FIGS. 8 and 12) at the enlarging ratio corresponding only to the pixel-addition ratio (double, 4 times). In an arrangement in which an image size can be selected, it is preferable to change the processes at steps SB8 and SB12 in FIG. 8 to a size enlarging or size reducing process as follows.

An image size is confirmed which has been set or selected previously to be recorded at the time. Then, the image size is compared with a size of YUV data (which can be determined depending on the pixel addition ratio) at the time. When the image size for recording is larger than the YUV data size, an enlarging ratio is calculated, at which ratio YUV data is enlarged to the image size for recording. On the contrary, when the image size for recording is smaller than the YUV data size, an enlarging ratio is calculated, at which ratio YUV data is reduced to the image size for recording. Then, the YUV data is enlarged or reduced in size at the calculated enlarging factor.

When the pixel addition ratio has been set to "double" and the aspect ratio of YUV data is different from the normal one, the size enlarging or reducing ratio is calculated separately for the vertical direction and horizontal direction, and YUV data is enlarged or reduced in size at the separate ratios for the vertical and horizontal directions. When the image for recording and YUV data have the same size, the still image shooting process is terminated without calculating the enlarging ratio and executing the enlarging or reducing process.

In the above process, a photographed image can be recorded in the image size set or selected at the time regardless of the pixel addition ratio or the subject luminance at the time. Therefore, for example it is prevented that still images are recorded in different sizes every shooting of a subject depending on the subject luminance. The recorded images can be arranged or used conveniently, and the digital camera can keep its high functional quality. The size enlarging or reducing process is required to be performed only once for securing the image recording size, and therefore no additional or useless enlarging or reducing process is required.

In addition to the function of preventing blurred images due to a hand shake or subject movement by raising a photographic sensitivity of CCD 6, a hand shake reducing function may be employed, which uses the conventional hand shake reducing mechanism of a lens shift type or of CCD shift type as described in the prior art. Both the functions may be used to prevent blurred images effectively.

In the embodiments of the invention, the invention has been described, which is employed for the still image shooting operation, but the invention may be used for recording a movie or for displaying a through image. AE control may be executed in accordance with the program diagram shown in FIG. 2, when a movie is recorded or a through image is displayed.

What is claimed is:

1. An image pick-up apparatus comprising:
a pixel adding unit which generates a pixel addition image by executing a pixel addition process for an image shot by an image pick-up element;
a luminance obtaining unit which obtains a subject luminance;
a pixel addition ratio changing unit which changes a pixel addition ratio of the pixel addition process by the pixel adding unit from a ratio of 1 to a ratio other than 1, in accordance with the subject luminance obtained by the luminance obtaining unit;
a size setting unit which sets a pixel size at a time of image recording to a pixel size designated by a user;
an enlarging unit which enlarges a pixel size of the pixel addition image generated by the pixel adding unit in accordance with a predetermined enlarging ratio, when the pixel addition ratio is changed to a ratio other than 1 by the pixel addition ratio changing unit; and
an enlarging ratio changing unit which changes the predetermined enlarging ratio to an enlarging ratio at which the pixel size of the pixel addition image is enlarged to the pixel size set by the size setting unit, when the pixel addition ratio is changed to a plurality of ratios other than 1 by the pixel addition ratio changing unit.

2. The image pick-up apparatus according to claim 1, wherein the enlarging ratio changed by the enlarging ratio changing unit includes an enlarging ratio of not larger than "1" (excluding "0").

3. The image pick-up apparatus according to claim 1, wherein the enlarging unit enlarges the shot image separately in vertical and horizontal directions, and the enlarging ratio changing unit changes enlarging ratios separately of the vertical and horizontal directions of the enlarging unit.

4. An image processing method for an image pick-up apparatus which records an image for which a pixel addition process is executed, the method comprising:
generating a pixel addition image by executing a pixel addition process for an image shot by an image pick-up element;
obtaining a subject luminance;
changing a pixel addition ratio of the pixel addition process from a ratio of 1 to a ratio other than 1, in accordance with the obtained subject luminance;
setting a pixel size at a time of image recording to a pixel size designated by a user;
enlarging a pixel size of the generated pixel addition image in accordance with a predetermined enlarging ratio, when the pixel addition ratio is changed to the ratio other than 1; and
changing the predetermined enlarging ratio to an enlarging ratio at which the pixel size of the pixel addition image is enlarged to the set pixel size, when the pixel addition ratio is changed to a plurality of ratios other than 1.

* * * * *